Aug. 3, 1965 F. L. MOSELEY 3,198,950
LINE FOLLOWING APPARATUS HAVING A LIGHT SOURCE ENERGIZED
BY SELECTED PHASES OF A REFERENCE VOLTAGE
Filed Nov. 21, 1960 2 Sheets-Sheet 1

FRANCIS L. MOSELEY
INVENTOR.
BY Fraser and Bogucki
ATTORNEYS

FRANCIS L. MOSELEY
INVENTOR.

BY Fraser and Bogucki

ATTORNEYS 3,198,950

LINE FOLLOWING APPARATUS HAVING A LIGHT SOURCE ENERGIZED BY SELECTED PHASES OF A REFERENCE VOLTAGE

Francis L. Moseley, Pasadena, Calif., assignor to F. L. Moseley Co., a corporation of California Filed Nov. 21, 1960, Ser. No. 70,813
15 Claims. (Cl. 250—202)

This invention relates to line or curve following apparatus and more particularly to such apparatus for providing a voltage which is representative of a graphical curve.

Automatic line recorders capable of drawing a line or curve representative of a function that is to be plotted are well known. It is sometimes desirable to regenerate the particular function which has been previously applied to the input of an automatic line recorder which produced a particular line representation. It may also be desirable to produce a voltage function which corresponds to a particular curve drawn by other means as, for example, a hand drawn representation of a mathematical relationship.

Line scanning devices are known which may be included in the over-all system of an automatic line recorder in order to permit the system to function as line following apparatus. Such an arrangement is disclosed for example in United States patent application Serial No. 46,249 of Francis L. Moseley and Andres O. Holdo entitled "Optical Curve Following System," now Patent No. 3,050,669. In this arrangement a photocell is enabled to scan the relative position of a particular line segment by means of an oscillating mirror synchronized with a reference frequency wave. A phase variable signal is provided at the output of the photocell which is related to the position of the scanning device with respect to the scanned line segment and which is employed to control the positioning of the device so as to follow the line as it moves thereunder. A potentiometer connected across a voltage source may be linked to the line following device in order to provide an output voltage which varies in accordance with the position of the device. However, the incorporation of a scanning arrangement which requires mechanically movable components as in the arrangement of the co-pending application, limits the minimum size and weight of the line scanning head. This invention is directed to a line following head providing for line detection without mechanical scanning which is smaller and lighter than previously known devices, thus effecting an improved response to positioning control signals.

It is a general object of the invention to provide an improved line sensing head for a line following system.

It is a further object of the invention to provide a line sensing head of smaller size and weight than has heretofore been available.

It is a further object of the invention to provide a line sensing device having no mechanical moving parts.

Briefly, in accordance with the invention, a line following system including a detecting head is provided which incorporates a single photocell centrally positioned with respect to three lamps employed for illuminating the line to be scanned. The lamps are equally spaced in a row aligned substantially transversely to the direction of a base line of the medium on which the line is plotted. In accordance with the invention the lamps are energized by alternating currents of different phases which are derived from a reference phase source. Thus, as the scanned line moves under one or another of the illuminating lamps, the associated photocell develops a phase varying signal in correspondence to the position of the line with respect to the lamps. This signal is amplified and applied to a control winding of a servo motor which in response to the phase varying signal moves the head to follow the line. At the same time, the motor drives a movable arm of a potentiometer connected across a voltage source in order to provide an output voltage which is representative of the position of the head and therefore of the scanned line segment.

In accordance with the invention the variable phase energization of the respective lamps is achieved by connecting the center lamp directly across the source of reference alternating voltage while each of the two outside lamps is connected across the reference voltage in series with a rectifier. The two rectifiers in the circuits of the outside lamps are poled in opposite directions. By this means, the associated outside lamps are energized 180° out of phase with each other and at a frequency which is the same as the frequency of the reference voltage. The center lamp is energized twice for each cycle of reference voltage. When the light from the three lamps is balanced at the photocell, as it is when the scanned line is centered under the line following head, the light intensities from the two outside lamps are equal and combine to form a component of twice the reference voltage frequency which adds to that of the center lamp. If, however, the line becomes slightly displaced from the reference position at the head, the components of light from the two outside lamps differ so that the photocell output contains a component of the frequency of the reference source and having a phase which is determined by the particular outside lamp contributing this component. The output of the photocell is connected in an amplifier circuit containing frequency selective filters which respond to components of signal at the frequency of the reference source but reject the components of signal at a frequency of twice the reference source. The output of this amplifier is therefore an alternating signal of reference source frequency having a phase and magnitude determined by the deviation of the line following head from a central position over the line.

A better understanding of the invention may be gained from a consideration of the following detailed description taken in conjunction with the drawings in which.

Figure 1:
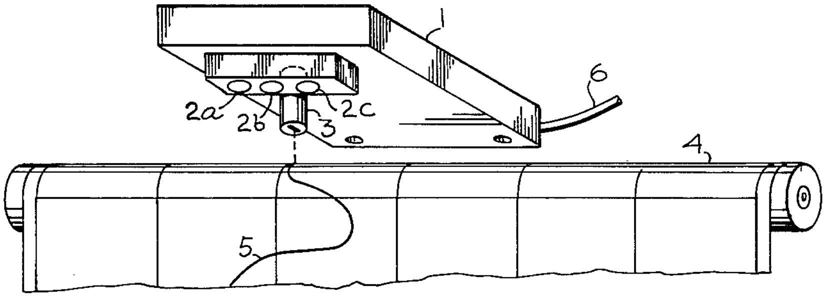
FIG. 1 is a perspective view of a portion of one particular embodiment of the invention.

Throughout the drawings similar elements have been given corresponding numerical designations. In FIG. 1 a line sensing head 1 is shown having mounted thereon a plurality of lamps *2a*, *2b* and *2c* together with a photocell 3. Shown underneath the head 1 is a chart 4 bearing a line 5 which is to be followed. A cord 6 is shown attached to the head 1 for providing electrical connections between the head 1 and associated equipment.

Figures 2, 5:
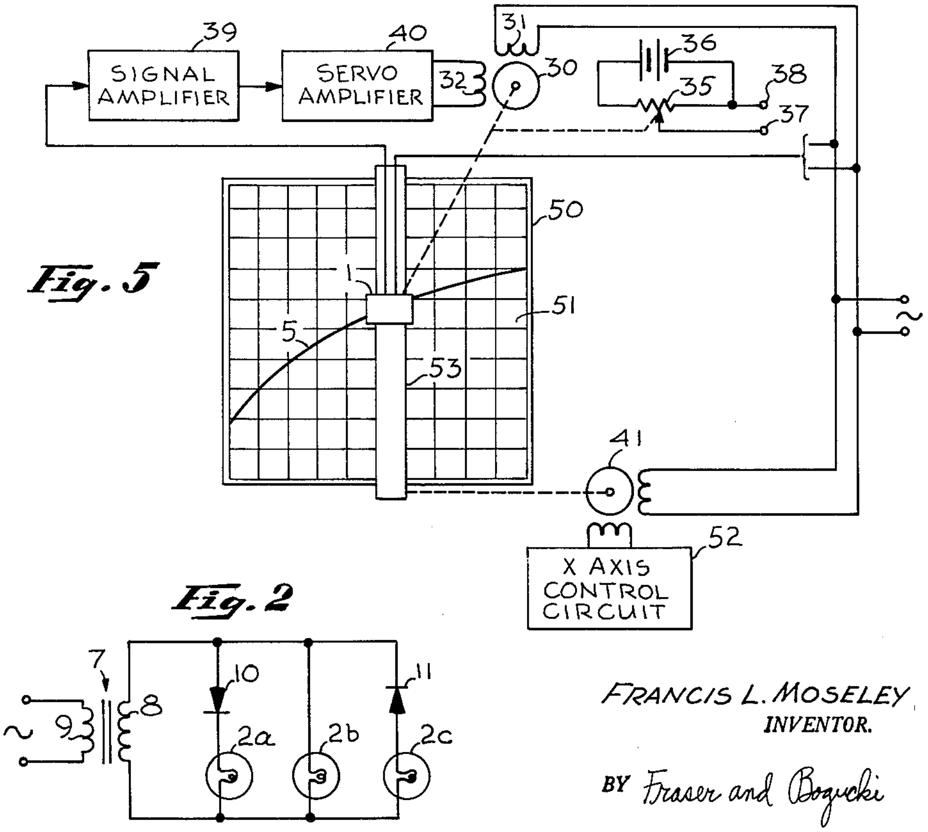
FIG. 2 is a schematic representation of a lamp circuit for use in the embodiment of FIG. 1.
FIG. 5 is a combination block and schematic diagram of a second line following system in accordance with the invention.

FIG. 2 depicts the lamp circuit for the line follower of FIG. 1 and shows a transformer 7 having a secondary winding 8 across which the three lamps *2a*, *2b* and *2c* are connected. A rectifier 10 is shown in series with the lamp *2a* while a rectifier 11, poled oppositely to rectifier 10, is shown in series with the lamp *2c*. The primary winding 9 of the transformer 7 is arranged to be connected to a source of reference potential which is also employed as the reference voltage for the servo motor 30 (FIG. 4) which controls the position of the head 1. It will be appreciated that the lamps *2a* and 2C which are the outer lamps of the bank of three flicker in intensity at the frequency of the reference voltage but out of phase with each other. The lamp *2b*, however, which is connected directly across the secondary winding 8 flickers in intensity at a rate which is twice the frequency of the reference voltage.

Figure 3:
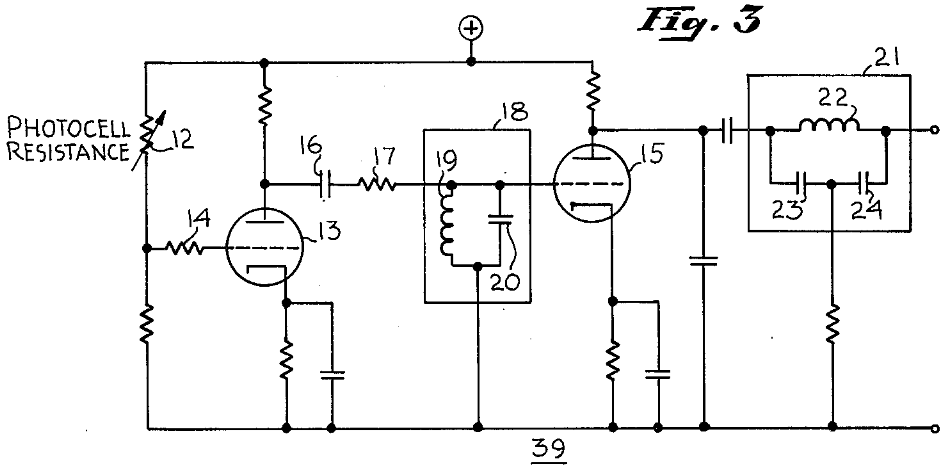
FIG. 3 is a schematic representation of an amplifying circuit which may be employed with the arrangement of FIG. 1.

FIG. 3 represents schematically an amplifying circuit in which the photocell resistance is connected to provide the desired phase variable signals for energizing the head positioning servomotor. The photocell resistance 12 is shown as part of a voltage divider network which is connected to the control grid of a vacuum tube 13 via a resistor 14. The photocell resistance 12 varies in magnitude in accordance with the intensity of the light incident thereon. As the light decreases in intensity the resistance 12 increases and vice versa. Thus, a varying signal is developed at the grid of the tube 13 in accordance with the variations of light intensity incident upon the photocell 3. From the plate of the vacuum tube 13, the amplified signal is directed to the control grid of a vacuum tube 15 via a capacitor 16 and a resistor 17. A filter network 18 comprising an inductance 19 and capacitor 20 is connected to the control grid of the vacuum tube 15. This network 18 is tuned in resonance to the frequency of the reference voltage so as to enhance the amplitude of signals of this frequency. From the plate of the vacuum tube 15 the signal passes through a second filter network 21 comprising an inductance 22 and a pair of capacitors 23 and 24 arranged to reject signals of a frequency which is twice that of the reference voltage. From the filter 21 the signal is passed to an output terminal.

To better understand the operation of the invention, let it be assumed initially that the scanned line segment is centered underneath the central lamp *2b*. The photocell 3 thus receives light from the lamp *2b* and also receives equal components originating with the lamps *2a* and *2c*. The composite light signal is thus essentially a signal varying at a rate which is twice the frequency of the reference voltage. This is the frequency to which the rejection filter 21 is tuned and therefore the output of the circuit of FIG. 3 is substantially zero.

If, however, the line segment being scanned is displaced from a center position, for example toward the lamp *2a*, a different signal will be produced by the photocell resistance 12 in the circuit of FIG. 3. In such a case, the line absorbs light from the lamp *2a* to a greater extent than from the lamp *2c*. Thus the lamp *2c* has a greater influence upon the magnitude of the photocell resistance 12. Accordingly, a signal is developed which varies in phase with the flickering of the lamp *2c* and at a rate which corresponds to the frequency of the reference voltage. This signal is amplified through the circuit of FIG. 3 and is produced at the output thereof for presentation to the servo amplifier to control the associated servo motor.

Figure 4:
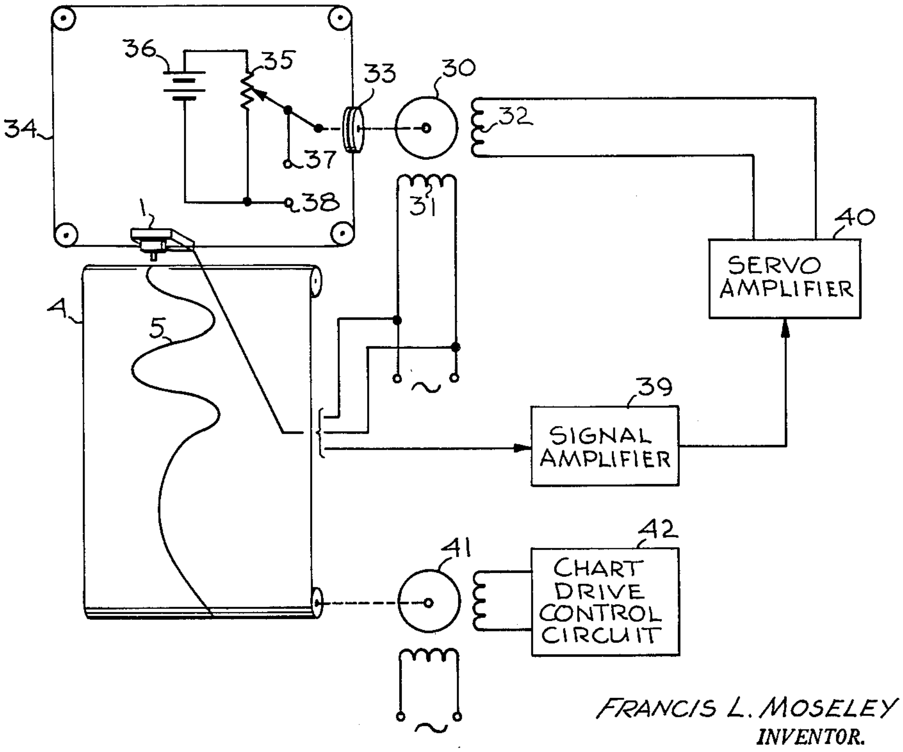
FIG. 4 is a combination block and schematic diagram of one line following system in accordance with the invention.

FIG. 4 depicts a system employing the embodiment of FIG. 1 and shows a chart 4 in association with the line following head 1. A servo motor 30 having control windings 31 and 32 is arranged by means of a drive pulley 33 and a belt 34 to control the position of the line following head 1. The servo motor 30 also drives a movable arm of a potentiometer 35 which is connected across a source of voltage 36 so as to provide at output terminals 37 and 38 a voltage representative of the position of the line following head 1 and therefore the particular segment of the line 5 being scanned. The control winding 31 is energized by a source of alternating reference voltage which is also fed to the head 1 where it is applied to the primary winding 9 (FIG. 2). The output of the photocell 3 of the head 1 is fed to the signal amplifier 39 depicted in FIG. 3, the output of which is connected to a servo amplifier 40 which serves to energize the control winding 32.

The chart 4 is driven by means of a servo motor 41 which is energized by a chart drive control circuit 42. This is a circuit known in the art which may be employed to provide a selected control of the servo motor 41 in order to drive the chart 4 at a rate selected by the operator. Thus it can be seen that the voltage presented at the output terminals 37 and 38 which corresponds to the variations in position of the line 5 as it passes underneath the head 1 is developed as a function of the signal from the chart drive control circuit 42 selected to energize the servo motor 41.

While the invention has thus far been described in conjunction with a strip chart as the line carrying medium, it will be understood that the invention is not to be limited to such a particular application. FIG. 5 depicts a particular arrangement in which the invention may be employed to advantage in connection with an "X–Y recorder." In the arrangement of FIG. 5, a table 50 of an X–Y recorder is shown on which is mounted a medium such as a sheet of graph paper 51 bearing a line 5 which is to be tracked. Mounted transversely on the table 50 is a movable carriage 53 which is mechanically linked to the servo motor 41 controlled by an X-axis control circuit 52 so that it may be moved across the table 50 in the horizontal or X-axis direction. The line following head 1 is shown positioned on the carriage 53 and is movable in the vertical or Y-axis direction under the control of the servo motor 30 which is mechanically linked to the head 1.

In the operation of the arrangement of FIG. 5 the carriage 53 is moved conventionally from left to right in accordance with a particular horizontal control function selected by the operator and generated by the circuit 52. The line following head 1 moves in a transverse direction following the line 5 in the manner already described. The associated potentiometer mechanically linked to the servo motor 30 produces an output voltage at the terminals 37, 38 which corresponds to the function represented by the line 5.

While it is clear that the line following head of the invention performs a particularly advantageous function where employed in conjunction with line recorders and function generating apparatus, it should be understood that its utility is not limited to such applications. It is not required that a circuit be associated therewith in order to produce an output voltage corresponding to the particular line being followed.

Apart from its use in conjunction with line recording apparatus as a function generator, it may be employed wherever it is desired to track a line for whatever purpose. Thus any arrangement in which it is desired to develop relative motion between a line bearing medium and a specific mechanism, which motion is to be guided by the line, may employ the invention to advantage. Specific uses of the invention other than those described in detail above, will occur to those skilled in the art within the spirit and scope of the invention.

Although particular arrangements of line following apparatus have been described above in order to illustrate the manner in which the invention may be used to advantage, it will be appreciated that the invention is not limited thereto. Accordingly, any and all modifications, variations or equivalent arrangements falling within the scope of the annexed claims should be considered to be a part of the invention.

What is claimed is:

1. A line sensing device for an automatic line following apparatus comprising a single photocell, a plurality of lamps, a source of reference voltage, means for energizing certain of the respective lamps with different selected portions of the waveform occurring at different times in the cycle of said reference voltage, means for reflecting light from said lamps towards said photocell, and means for generating a signal from said photocell which is indicative of the position of said line sensing device relative to a portion of said reflecting means having a distinguishing reflecting capability.

2. A line sensing device in accordance with claim 1 wherein said lamp energizing means comprises means for energizing different lamps respectively at different frequencies which are integral multiples of the frequency of the reference voltage.

3. A line sensing device for an automatic line following apparatus comprising a single photocell, a plurality of lamps, a source of reference voltage, means for energizing the respective lamps with different selected portions of the waveform of said reference voltage, means for reflecting light from said lamps towards said photocell, and means for generating a signal from said photocell which is indicative of the position of said line sensing device relative to a portion of said reflecting means having a distinguishing reflecting capability, said lamp energizing means comprising means for energizing different lamps respectively at different frequencies which are integral multiples of the frequency of the reference voltage including a pair of rectifiers individually connected with opposite polarity in series with corresponding ones of said lamps.

4. Line following apparatus including a photocell, at least two light sources arranged to provide light for reflection to the photocell, means for energizing said light sources respectively from opposite polarity portions of an applied alternating electrical waveform occurring in different time intervals in the cycle of the alternating electrical waveform, and means for comparing the phase of the output of the photocell with said alternating electrical waveform to provide an indication of the position of a line segment under the light sources relative to the photocell and the light sources.

5. Line following apparatus including a photocell, at least two light sources arranged to provide light for reflection to the photocell, a common source of electrical signals for providing an alternating electrical waveform, a first rectifier coupling one of said light sources to the electrical signal source, a second rectifier coupling the other light source to the electrical signal source, said first and second rectifiers being poled in opposite directions so as to energize the light sources respectively from opposite polarity portions of the applied alternating electrical waveform, and means for comparing the phase of the output of the photocell with the alternating electrical waveform to provide an indication of the position of a line segment under the light sources relative to the photocell and light sources.

6. Line following apparatus for indicating the position of successive sections of a line on a chart comprising a single photocell and a plurality of lamps positioned adjacent the chart and arranged to be movable with respect thereto, said lamps and said photocell facing the chart, a reference alternating voltage, means for applying said reference voltage individually to said lamps in order to energize said lamps respectively at different frequencies related to the frequency of the reference voltage, means for sensing the resistance of said photocell to produce electrical signals indicative of the position of a scanned line section relative to the position of the photocell and lamps, means for passing only signals of a predetermined frequency, means responsive to said passed signals and to said reference voltage for moving the photocell and lamps in accordance with the signals, and means for generating an output signal corresponding to the function representing the scanned line.

7. Line following apparatus in accordance with claim 6 wherein the reference voltage applying means comprises unilateral current conducting elements selectively disposed in series with particular ones of said lamps.

8. Line following apparatus in accordance with claim 7 wherein the unilateral current conducting elements comprise a first rectifier connected with a given polarity in series with a first one of said lamps and a second rectifier connected with an opposite polarity in series with a second one of said lamps.

9. A system for generating an electrical signal which is representative of a line on a recording medium comprising a line bearing medium, a line following head including a plurality of lamps and a single photocell responsive to reflected illumination from the lamps, a single source of reference alternating voltage, means for energizing the lamps respectively at different frequencies and from different portions of the waveform applied from the single alternating voltage source, first positioning means for producing relative motion between the medium and the head in a first coordinate direction, second positioning means connected to the output of the photocell for producing relative motion between the medium and the head in a second coordinate direction, and electrical signal generating means mechanically linked to the second positioning means.

10. A system in accordance with claim 9 wherein the position of the head is fixed in one coordinate direction and the line bearing medium comprises a strip chart movable adjacent the head.

11. A system in accordance with claim 9 wherein the line bearing medium comprises a fixed graph and the first positioning means comprises a carriage movable in the first coordinate direction and the second positioning means comprises means for mounting the head on the carriage so that the head is movable along the carriage in the second coordinate direction.

12. Line following apparatus including a line bearing medium, a line following head comprising a single photocell and a plurality of lamps for illuminating the line so that reflected illumination may be directed to the photocell, means for varying the illumination from the respective lamps in selected different frequencies and different phase relationships, first means for producing relative motion between the medium and the head in a first direction, second means for producing relative motion between the medium and the head in a second direction substantially transverse to the first direction, and means for controlling the second motion producing means in response to signals of a predetermined frequency from the photocell in order to cause the head to follow the line.

13. Apparatus for following a line and providing an output voltage corresponding to the function represented by the line comprising a photocell moveable along the line and positioned to receive light reflected therefrom, a plurality of lamps positioned adjacent the photocell for directing light toward the line; a source of reference alternating voltage; means for applying said reference voltage to said lamps so that a first one of the lamps is energized by a first selected portion of the alternating voltage waveform, a second lamp is energized by a second selected portion of the alternating voltage waveform and a third lamp is energized by the complete alternating voltage waveform; a frequency selective circuit coupled to the photocell for rejecting electrical signals having twice the frequency of said reference source and for passing electrical signals of the frequency of said source; photocell positioning means coupled to said circuit for moving the photocell in response to the phase relationship of the passed signals to the reference voltage; and means for generating an output signal indicative of the position of the photocell.

14. Line following apparatus comprising a line bearing medium, a source of reference alternating voltage, a plurality of lamps for directing light at said medium, a photocell positioned to receive light reflected from the medium, means for energizing the lamps from the reference alternating voltage source including means for causing the light from one of said lamps to fluctuate at a frequency which is twice the frequency of the source and the others of the lamps to fluctuate at the frequency of the source but in opposite phase with respect to each other, frequency selective means coupled to the photocell for passing signals of the frequency of the reference source indicative of the position of the photocell with respect to the line, and means responsive to the passed signals and to the reference alternating voltage for moving the photocell to follow the line.

15. Apparatus in accordance with claim 14 wherein the means for energizing the lamps comprises oppositely poled rectifiers connected in series with respective ones of the other lamps and means for applying the reference voltage directly to the first lamp.

References Cited by the Examiner

UNITED STATES PATENTS

| | | | |
|---|---|---|---|
| 2,665,395 | 1/54 | Feinberg | 315—135 X |
| 2,815,487 | 12/57 | Kaufman | 315—200 |
| 2,999,938 | 9/61 | Hann et al. | 250—202 |
| 3,079,835 | 3/63 | Saperstein | 250—202 X |

RALPH G. NILSON, *Primary Examiner.*

RICHARD M. WOOD, ARCHIE R. BORCHELT, *Examiners.*